United States Patent [19]
Lingnau

[11] 3,844,025
[45] Oct. 29, 1974

[54] METHOD OF MAKING A PRESSURE ACTUATED CONTROL DEVICE

[75] Inventor: Josef Lingnau, Bremen-Borgfeld, Germany

[73] Assignee: Gestra-KSB Vertriebsgesellschaft mbH & Co. Kommanditgesellschaft, Bremen, Germany

[22] Filed: Aug. 15, 1973

[21] Appl. No.: 388,681

[30] Foreign Application Priority Data
Aug. 23, 1972 Germany............................ 2241336

[52] U.S. Cl...................... 29/482, 29/463, 29/475, 29/493
[51] Int. Cl.......................... B23k 1/20, B23k 31/02
[58] Field of Search ............ 29/482, 446, 463, 475, 29/493; 92/96; 251/331, 61

[56] References Cited
UNITED STATES PATENTS
1,836,634   12/1931   Urfer ............................... 29/493 X
2,123,381   7/1938    Reichel ............................. 29/482 X
2,534,123   12/1950   Hasselhorn ....................... 29/463 X
3,004,326   10/1961   Merz ................................. 29/463 X
3,352,211   11/1967   Jorgensen et al ................. 29/482 X Primary Examiner—C. W. Lanham
Assistant Examiner—Victor A. Di Palma
Attorney, Agent, or Firm—Allison C. Collard

[57] ABSTRACT

A method of making light weight pressure actuated diaphragm control units from two thin preshaped resilient casing shells having clamping flanges diverging at an outwardly oblique angle from the hollow bodies of the shells by employing external cylindrical clamping devices and sufficient force to reshape the preformed diverging flanges by flattening them against the diaphragm and then welding the peripheral edges of this clamped assembly to permanently secure the clamping flanges in the flattened position for improved clamping of the diaphragm in the device and longer operating life.

3 Claims, 3 Drawing Figures

PATENTED OCT 29 1974 3,844,025

METHOD OF MAKING A PRESSURE ACTUATED CONTROL DEVICE

The present invention relates to a method for making a control device actuated by pressure of a fluid and having two thin-walled plate-like housing or casing members and a membrane or diaphragm which is held therebetween and which is flexed under the pressure applied by a pressure medium. The housing members include clamping means for the diaphragm in the form of flanges. These clamping flanges are bands running around the periphery and they extend some distance inwardly from the outer or peripheral edge of the housing members. The diaphragm and the housing portions are tightly welded together at the peripheral edge.

As a result of the welding operation, the diaphragm as well as the housing members undergoes a material change, because the welded zone becomes sensitive to the flexing force and less resistant to breakage. Therefore, in order to increase the life span of the welded portions of the present device, the clamping area for the diaphragm separates the welded zone from the flexing zone of the membrane.

It is therefore an object of this invention to provide an improved method for making control device of the aforementioned type.

A further object of the invention is to provide that the clamping position for the diaphragm is such that an adequate constant force is assured for clamping the diaphragm.

The objects of the invention are achieved when both of the housing members are preformed with clamping flanges that diverge at the edge margins; and after the housing flanges contact the diaphragm in their original oblique or outwardly flaring orientation, these flanges are engaged by external clamping tools and deformed or reshaped elastically toward each other, after which the welding is performed when the diaphragm or membrane is fixed in its operating position. When the clamping tools are removed after completing the welding, the flattened clamping flanges of the housings act as spring arms as a result of the residual strains from reshaping and because the clamping area of the flanges is wide enough to obtain a flat clamping force on the diaphragm, whereby the two housing members press against each other in a safe and secure manner.

It is another object of the invention that the housing flanges are bent toward the peripheral edge of the diaphragm. Therefore, these three components form a compact element at the outer edges which is advantageous for the welding operation.

The drawings show central sectional views of an embodiment of the aforementioned type in three stages of development.

Other objects and features of the present invention will become apparent from the following detailed description taken in connection with the accompanying drawings which show the embodiments of the invention. It is to be understood, however, that the drawings are designed for the purpose of illustration only, and not as a definition of the limits and scope of the invention.

In the drawing, wherein similar reference numerals denote similar elements throughout the several views.

Figure 1:
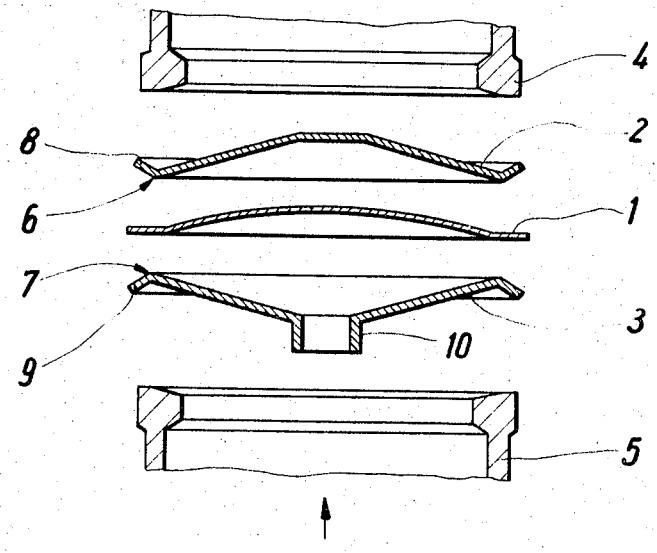
FIG. 1 shows the preformed individual parts of the control device and the external clamping tools employed in making it.

In FIG. 1, thin walled plate-like housing members 2 and 3 are provided on opposite sides of the membrane or diaphragm 1. These three circular components form a pressure actuated control device. On top and below the housing units 2 and 3 are annular ring-like clamping tools 4 and 5. The operating equipment for the clamping tools is not shown.

The housing members 2 and 3 are provided with circular clamping ridges 6 and 7 for the diaphragm, whereby the clamping area is set off and extends inwardly from the outer edge. The housing members are preformed of resilient material in such a manner that the clamping flanges 8 and 9 of substantial width diverge from the clamping ridges 6 and 7 toward the periphery. As is apparent in FIG. 1, the flanges 8 and 9 flare outwardly at an oblique angle from the bodies of the casing units 2 and 3, respectively.

Figure 2:
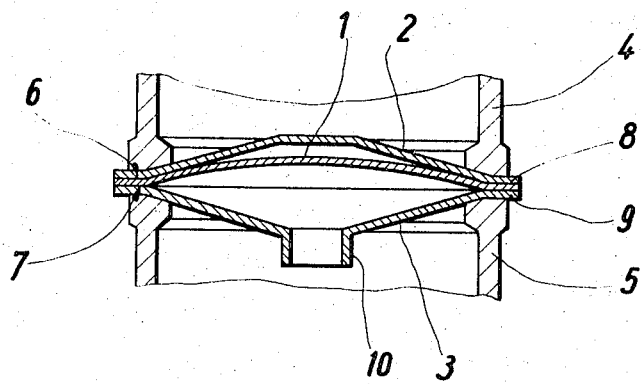
FIG. 2 shows the assembled parts after they are joined together and are clamped in the tools ready to be welded.

The preformed housing members 2 and 3 are positioned with the clamping ridges 6 and 7 in register and on opposite sides of diaphragm 1. Then the flanges 8 and 9 of the two housing units are clamped together, i.e., the two flanges are yieldingly bent flat against the diaphragm with their full areas in firm contact with the diaphragm as shown in FIG. 2, as a result of an external clamping force applied to the clamping tools 4 and 5. Preferably, the outer edges of flanges 8 and 9 of the two housing members are in registering engagement with outer edge of the diaphragm.

In this condition, when the membrane 1 is temporarily fastened in a clamped position by the clamping tools 4 and 5, the outer edges of housing units 2 and 3 and the diaphragm 1 are welded. The advantageous concept is, as previously stated, that components 1, 2 and 3 of the device are integrated into one single compact unit at the outer edge of the welded zone.

Figure 3:
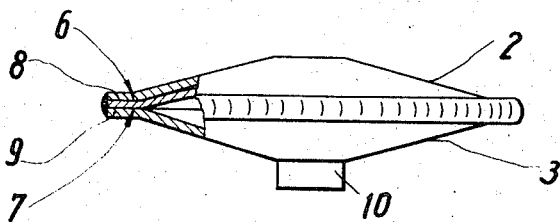
FIG. 3 is a combination section and side elevation of the finished welded control device.

When the control or adjusting device is finished as shown in FIG. 3, that is after the welding is completed and after the clamping tools are removed, the clamping flanges 8 and 9 of housing members 2 and 3 act like spring arms which press against both faces of diaphragm 1 at the clamping lines 6 and 7 thereby retaining that part of the diaphragm in a fixed position. This highly desirable spring arm effect results from the residual strains imparted to housing shells 2 and 3 by the reshaping or elastic deformation of the resilient flanges 8 and 9 and the locking of those strains into the flattened flanges by the welding of their edges.

In the illustrated embodiment the lower housing unit 3 is provided with a neck 10 which may be connected to a valve actuated by the instant control device. The spindle of the valve can extend through the neck 10 and engage the diaphragm 1 in a non-positive manner and be adjusted thereby. The hollow space between diaphragm 1 and housing unit 2 may be filled with a thermally expansible fluid as the pressure means. Housing shell 2 may also be provided with a connection for a pneumatic and/or hydraulic control pipe line. Moreover the use of the control device is not limited to valves and may be used to regulate or adjust many other devices or systems in response to pressure variations acting on diaphragm 1.

While only a few embodiments of the present invention have been shown and described, it will be obvious to those persons skilled in the art that many changes and modifications may be made thereunto without departing from the spirit and scope of the invention.

What is claimed is:

1. A method for making a pressure actuated control device having a diaphragm located between two housing members which comprises:

performing two thin walled housing members with obliquely flared peripheral clamping flanges of substantial width diverging outwardly from normal clamping position the flanges having clamping areas disposed along their inner edges;

assembling said housing members in register with one another on opposite sides of a flexible diaphragm;

clamping said assembly together with external clamping means under sufficient external clamping force to elastically deform said flanges and bring their full clamping areas into firm contact with said diaphragm; and welding the peripheral edges of said clamped assembly while said flanges remain elastically deformed.

2. A method according to claim 1 in which said housing members are constructed of thin walled resilient material.

3. A method according to claim 1 in which said flanges are flattened and the peripheral edges thereof are bent toward each other by said external clamping force.

* * * * *